(12) United States Patent
Rauch et al.

(10) Patent No.: US 9,212,567 B2
(45) Date of Patent: Dec. 15, 2015

(54) GAS DUCT FOR A GAS TURBINE AND GAS TURBINE HAVING SUCH A GAS DUCT

(75) Inventors: Marc Rauch, Regensdorf (CH); Tobias Steffen, Geroidswill (CH); Joachim Krautzig, Widen (CH); Amin Busekros, Zurich (CH); Juergen Pacholleck, Taegerig (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 3 days.

(21) Appl. No.: 13/602,484

(22) Filed: Sep. 4, 2012

(65) Prior Publication Data

US 2013/0055725 A1    Mar. 7, 2013

(30) Foreign Application Priority Data

Sep. 5, 2011    (CH) ...................................... 1454/11

(51) Int. Cl.
    *F02K 1/80*        (2006.01)
    *F01D 25/28*     (2006.01)
    *F01D 25/30*     (2006.01)

(52) U.S. Cl.
    CPC ................ *F01D 25/30* (2013.01); *F01D 25/28* (2013.01); *F02K 1/80* (2013.01); *F05D 2240/15* (2013.01)

(58) Field of Classification Search
    CPC .............. F23R 3/002; F23R 3/60; F02C 7/20; F01D 25/28; F01D 25/30; F05D 2240/15; F05D 2240/90; F05D 2240/91; F02K 1/04; F02K 1/80; F02K 1/78; F02K 1/82; F02K 1/822
    USPC ...................... 60/796, 797, 798, 799; 415/142
    See application file for complete search history.

(56) References Cited

U.S. PATENT DOCUMENTS 4,363,208 A * 12/1982 Hoffman et al. ................ 60/800
4,369,016 A *  1/1983 Dennison ....................... 415/142

(Continued)

FOREIGN PATENT DOCUMENTS

| GB | 2 280 484 A | 2/1995 |
| JP | 2003-314299 A | 11/2003 |
| RU | 2399775 C2 | 9/2010 |

OTHER PUBLICATIONS

European Patent Office, Search Report in Swiss Patent Application No. 1451/2011 (Nov. 29, 2011).

(Continued)

*Primary Examiner* — William H Rodriguez
*Assistant Examiner* — Jason H Duger
(74) *Attorney, Agent, or Firm* — Buchanan Ingersoll & Rooney PC

(57) ABSTRACT

A gas duct for a gas turbine through which exhaust gases from the gas turbine are discharged to an outside includes a concentric inner casing and an outer casing disposed at a distance from the inner casing and concentrically encompassing the inner casing. A plurality of radial support struts interconnect the inner casing and the outer casing. Each of the support struts, the inner casing and the outer casing each have a heat-resistant lining disposed so as to provide protection against heat from the exhaust gases. The heat-resistant the linings of each of the support struts, the inner casing and the outer casing are divided in each case into a plurality of separate segments that are fastened to a support structure in an arrangement that provides an individual entirely or almost stress-free thermal expansion of each of the plurality of separate segments in an expansion plane.

11 Claims, 4 Drawing Sheets

(56) References Cited

U.S. PATENT DOCUMENTS

| | | | | |
|---|---|---|---|---|
| 4,883,407 | A | * | 11/1989 | Touze .......................... 415/190 |
| 4,920,742 | A | * | 5/1990 | Nash et al. ...................... 60/799 |
| 4,987,736 | A | | 1/1991 | Ciokajlo et al. |
| 4,993,918 | A | | 2/1991 | Myers et al. |
| 5,069,034 | A | * | 12/1991 | Jourdain et al. ................ 60/766 |
| 5,363,643 | A | * | 11/1994 | Halila ............................ 60/796 |
| 5,592,814 | A | * | 1/1997 | Palusis et al. .................. 60/770 |
| 6,041,590 | A | * | 3/2000 | Hayton et al. ................. 60/766 |
| 7,757,495 | B2 | * | 7/2010 | Bessagnet et al. ............. 60/800 |
| 2010/0126079 | A1 | * | 5/2010 | Kristensen ....................... 52/40 |
| 2010/0135786 | A1 | | 6/2010 | Manteiga et al. |

OTHER PUBLICATIONS

Official Action issued Jun. 17, 2014 by the Russian Patent Office in corresponding Russian Application No. 2012137773 and English Translation (9 pages).

Decision of Grant issued on Jan. 13, 2015 by the Russian Patent Office in corresponding Russian Application No. 2012137773, and an English translation thereof.

* cited by examiner

GAS DUCT FOR A GAS TURBINE AND GAS TURBINE HAVING SUCH A GAS DUCT

CROSS-REFERENCE TO PRIOR APPLICATION

Priority is claimed to Swiss Patent Application No. CH 01454/11, filed on Sep. 5, 2011, the entire disclosure of which is hereby incorporated by reference herein.

FIELD

The present invention relates to the field of gas turbine technology. It refers to a gas duct for a gas turbine. The invention also refers to a gas turbine having such a gas duct.

BACKGROUND

The present invention relates to gas turbines, especially to stationary industrial gas turbines, as are reproduced in FIG. 1 in a perspective, partially sectioned view. FIG. 1 shows a gas turbine 10 of the GT26 type of ALSTOM. Combustion air is inducted in this gas turbine 10 by a compressor 12 via an air intake 11, and compressed, and fed into a first combustion chamber 13 for combusting a fuel. Arranged downstream of the first combustion chamber 13 is a first (high-pressure) turbine 14 which is driven by the hot gases from the first combustion chamber 13. Provided downstream of the first turbine 14 is a second combustion chamber 15 in which a fuel is combusted together with the residual oxygen which is present in the hot gases. The hot exhaust gases from the second combustion chamber 15 drive a second (low-pressure) turbine 16 before they are discharged via a gas duct 17 to the outside or (in a combined cycle power plant) discharged into a subsequent heat recovery steam generator.

The gas duct 17 comprises a (basically cylindrical) inner casing 19 which usually serves for accommodating the exhaust gas-side rotor bearing and is enclosed concentrically and at a distance by an outer casing 18. Both casings 18 and 19 are interconnected by means of radial support struts 20 which are arranged in a distributed manner over the circumference. Through the gas duct 17, the hot exhaust gases are discharged from the gas turbine 10. For protection against the hot exhaust gases, the outer casing 18, the inner casing 19 and the support struts 20 are provided in each case with a lining or covering.

In the past, according to FIG. 2, different preformed parts were welded together to form in each case a top half 21a and a bottom half 21b of the gas duct 17'. The two halves 21a and 21b were then fastened via brackets on the support structure of the exhaust-gas housing and after being joined together were welded in the parting plane by means of welded joints 22 in order to achieve a closed flow duct.

As a result of this type of construction and assembly, various problems or disadvantages arose, however:
1. A susceptibility to cracks in the gas duct, specifically created by
   a. stress accumulation, namely
      i. large inherent stresses of the gas duct as a result of the welding, and
      ii. high thermal stresses;
   b. severe vibrations in combination with low natural frequencies of the gas duct;
2. poor scope for maintenance and repair.

Proposed in U.S. Pat. No. 4,920,742 for gas turbines is a support structure for supporting a segmented flow-path lining, which comprises a support bracket which is connected to a frame section and has a support device which is connected to the flow-path lining, wherein the support bracket is provided with a clearance hole in order to ensure a freely floating connection for free acceptance of axial and circumferentially occurring thermal expansion and contraction of the flow-path lining. The segmentation, however, is limited to the concentric regions of the flow-path lining and does not extend to the support struts and is comparatively coarse so that thermal stresses still constitute a problem and the scope for maintenance and repair is limited.

SUMMARY

In an embodiment, the present invention provides a gas duct for a gas turbine through which exhaust gases from the gas turbine are discharged to an outside. The gas duct includes a concentric inner casing and an outer casing disposed at a distance from the inner casing and concentrically encompassing the inner casing. A plurality of radial support struts interconnect the inner casing and the outer casing. Each of the support struts, the inner casing and the outer casing each have a heat-resistant lining disposed so as to provide protection against heat from the exhaust gases. The heat-resistant the linings of each of the support struts, the inner casing and the outer casing are divided in each case into a plurality of separate segments that are fastened to a support structure in an arrangement that provides an individual entirely or almost stress-free thermal expansion of each of the plurality of separate segments in an expansion plane.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
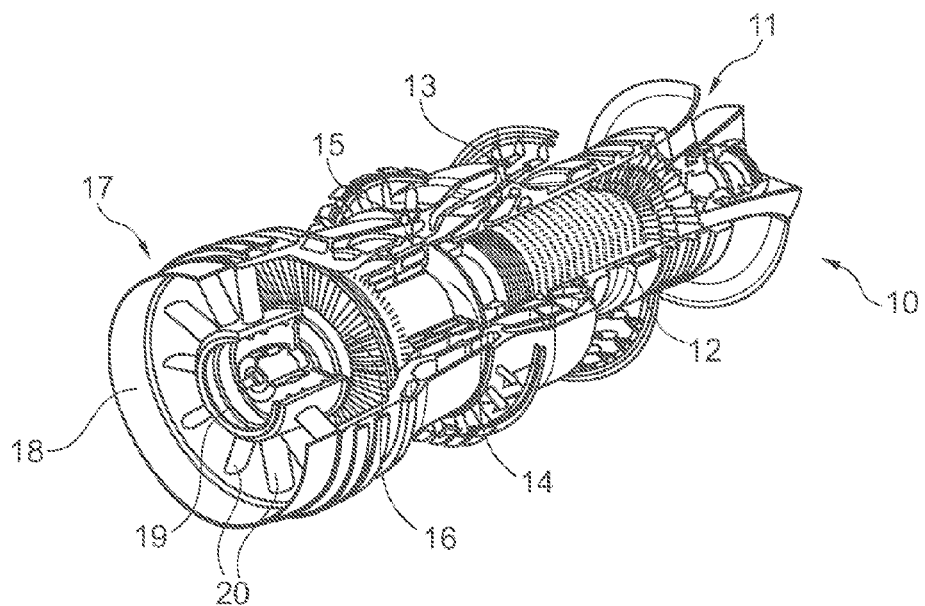
FIG. 1 shows in a perspective, partially sectioned view an industrial gas turbine with sequential combustion, as is suitable for implementation of an embodiment of the invention.
Figure 2:
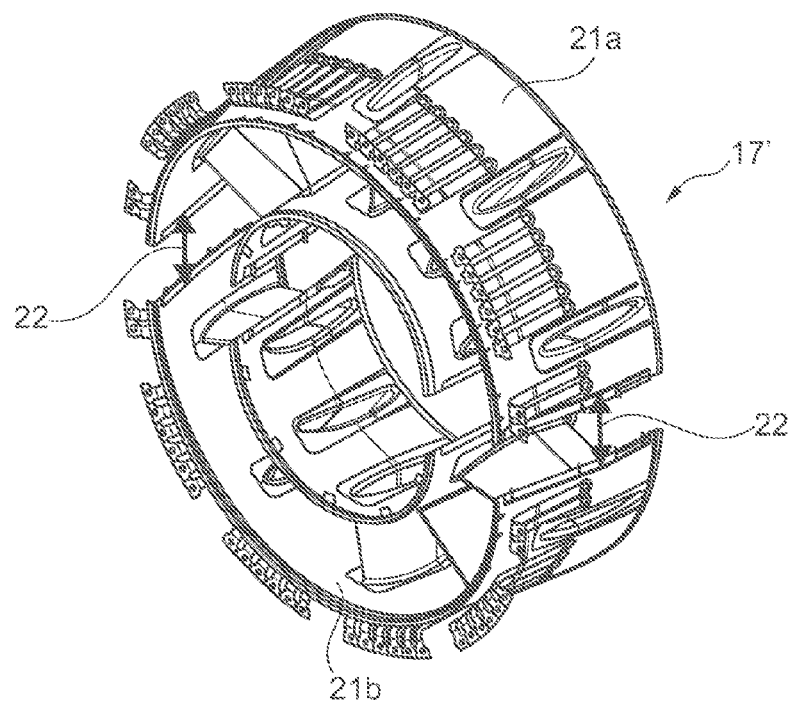
FIG. 2 shows a previously known art of the assembly of a gas duct for a gas turbine according to FIG. 1.

In an embodiment, the present invention provides a gas duct for a gas turbine which avoids the disadvantages of known solutions and is distinguished by a greatly improved accessibility with maximum avoidance of thermal stresses at the same time.

In an embodiment, the present invention is based on a gas duct for a gas turbine, which gas duct is formed by a concentric inner casing and an outer casing which concentrically encompasses the inner casing at a distance, and through which the exhaust gases from the gas turbine discharge to the outside, wherein the inner casing and the outer casing are interconnected by means of a multiplicity of radial support struts, and wherein the support struts, the outer casing and the inner casing are equipped in each case with a heat-resistant lining for protection against the hot exhaust gases.

In an embodiment, the linings of the support struts of the outer casing and of the inner casing are divided in each case into a plurality of separate segments which are fastened on a support structure in such a way that an individual entirely stress-free, or almost stress-free, thermal expansion of the individual segments in an expansion plane is possible.

One embodiment of the invention provides that the segments are detachably fastened on the support structure.

Another embodiment of the invention provides that the segments are fixed relative to the support structure at at least one fastening point and are fastened in a freely thermally expandable manner in the expansion plane at other fastening points.

A further alternative embodiment of the invention provides that the segments are fastened in a freely thermally expandable manner in the expansion plane relative to the support structure at all the fastening points.

Another embodiment of the invention provides that the support structure comprises a multiplicity of mountings in the region of the outer casing and the inner casing, upon which mountings the associated segments are fastened by screws.

The mountings preferably have a multiplicity of threaded holes, and the segments are fixed on the mountings by means of screws which are screwed into the threaded holes from the outside through corresponding holes in the segments.

It is also conceivable, however, that the mountings have a multiplicity of stud bolts which extend through corresponding holes in the segments, and that the segments are fastened on the stud bolts by means of corresponding clamping nuts. This type of fastening has advantages especially in more demanding regions of application (higher temperatures etc.).

The mountings especially extend in this case parallel to each other in the axial direction.

Another embodiment of the invention provides that the mountings are fastened on a concentric shell by means of radial supports.

A further embodiment of the invention provides that the mountings are circumferentially spaced apart by such a distance that a segment is fastened in each case on two adjacent mountings and extends circumferentially between two adjacent mountings.

The gas turbine according to an embodiment of the invention, having an exhaust-side gas duct through which the exhaust gases discharge from the gas turbine to the outside, provides that the gas duct is a gas duct according to an embodiment of the invention.

According to an embodiment of the present invention, the exhaust-side gas duct of a gas turbine is to be divided into a multiplicity of independent segments. These segments are fastened on a mounting structure. The gas duct is generally to be segmented in three regions. These three regions are the outer casing 18, the inner casing 19 and the support struts 20. The individual segments comprise correspondingly formed metal sheets which (via the mounting structure) are fastened on a support structure, lying thereunder, of the gas duct. This fastening is designed so that the completely stress-free, or almost stress-free, thermal expansion of the individual metal sheets is ensured in all operating states.

The mounting structure for the segments or metal sheets themselves is fastened on an inner or outer shell of the support structure. This fastening is also designed so that an entirely stress-free, or almost stress-free, thermal expansion in an expansion plane is possible. The number of connecting points to the support structure results from its size and from the loads which occur.

The segments are attached in a positionally fixed manner in relation to the support structure either at one (not necessarily central) point and from there can thermally expand in an entirely stress-free, or almost stress-free, manner in the expansion plane at the other fastening points, or they have the necessary clearance in the expansion plane at all the fastening points and can freely move within the constructionally necessary limits.

Figure 3:
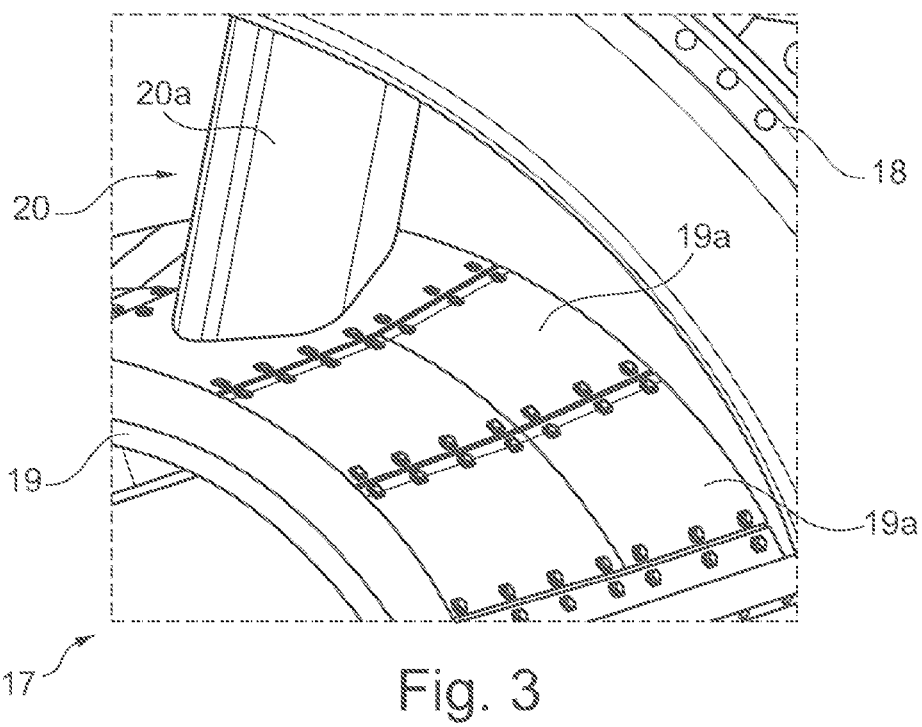
FIG. 3 shows in a perspective view a detail of a gas duct according to an exemplary embodiment of the invention.
Figure 4:
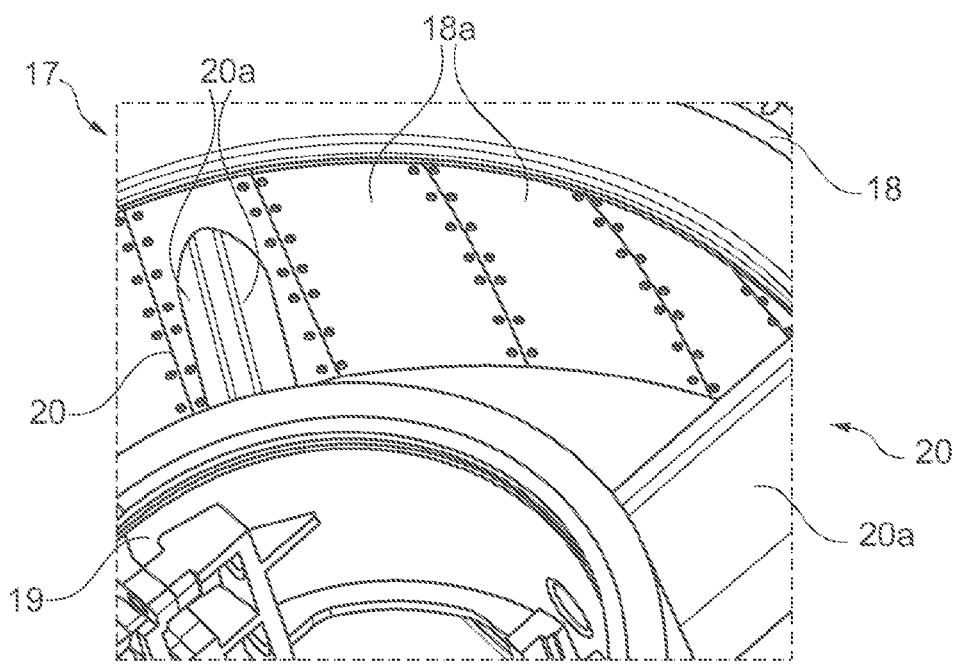
FIG. 4 shows another view of the gas duct from FIG. 3.

FIG. 3 shows in a perspective view a detail of a gas duct 17 according to an exemplary embodiment of the invention. To be seen are the outer casing 18, the inner casing 19 with corresponding segments 19a and a support strut 20 with corresponding segments 20a. FIG. 4 shows this exemplary embodiment from another viewing angle so that in this case the segments 18a of the outer casing 18 are also visible.

Figure 5:
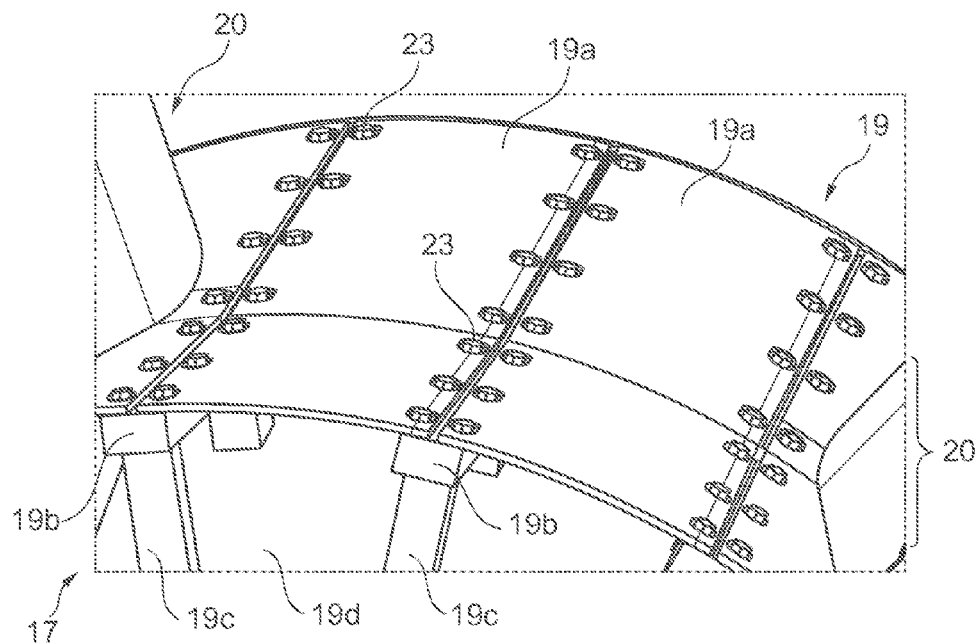
FIG. 5 shows an enlarged detail of the gas duct from FIG. 3.
Figure 6:
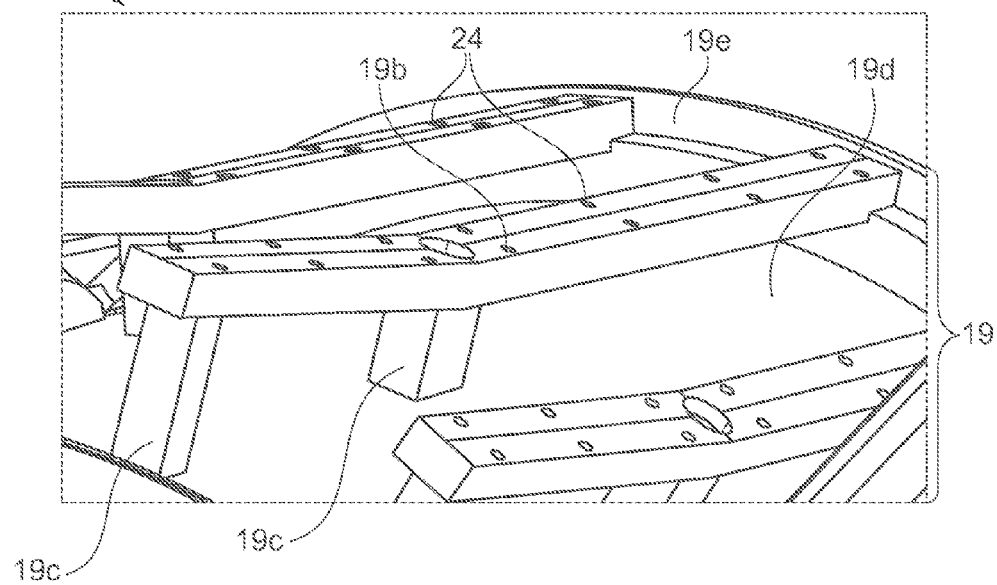
FIG. 6 shows a detail of the inner support structure of the gas duct from FIG. 3.
Figure 7:
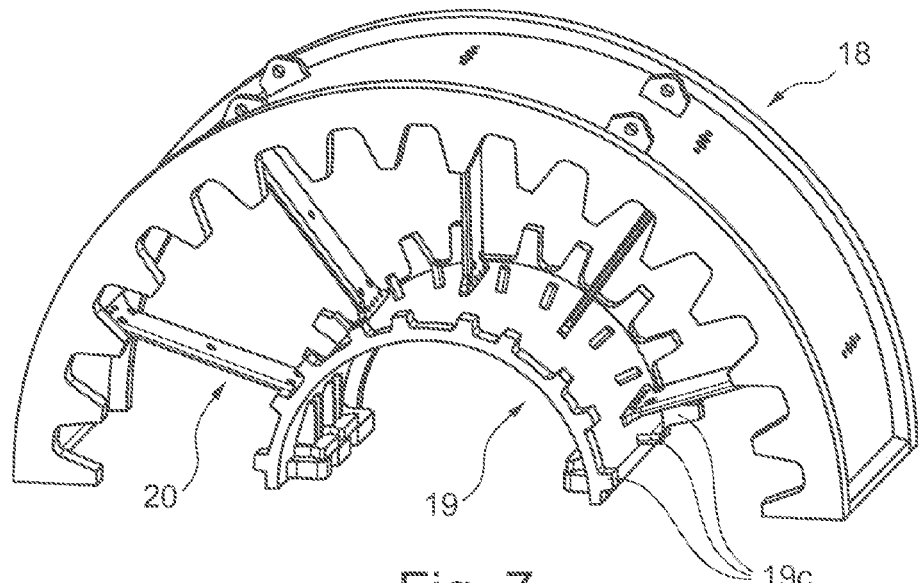
FIG. 7 shows the top half of a support structure according to a further exemplary embodiment of the invention.

In FIG. 5 and FIG. 6, the mounting structure for the segments 19a of the inner casing 19 can be seen (the mounting structure on the outer casing is correspondingly constructed). This mounting structure comprises mountings 19b which are arranged in a distributed manner around the circumference, extend parallel to each other in the axial direction, and on their outer side are provided with threaded holes 24. By their one end the mountings 19b bear against a ring 19e which—as with the inner shell 19d—is part of the support structure of the inner casing 19. Instead of the ring, separate supports 19c can also be provided according to FIG. 7. On the other side, the mountings 19b are supported on the inner shell 19d at a distance by means of supports 19c.

As is seen clearly in FIG. 5, the segments 19a are detachably fastened on the mountings 19b by means of screws 23 which are screwed into the threaded holes 24 in the mountings 19b. Each segment 19a extends in this case between adjacent mountings 19b and is screwed to these mountings in each case. As a result of this type of construction, on the one hand easy accessibility to all parts of the gas duct 17 is ensured. On the other hand, as a result of the extensive segmenting of the lining of the duct thermal stresses are reduced or completely avoided.

Figure 8:
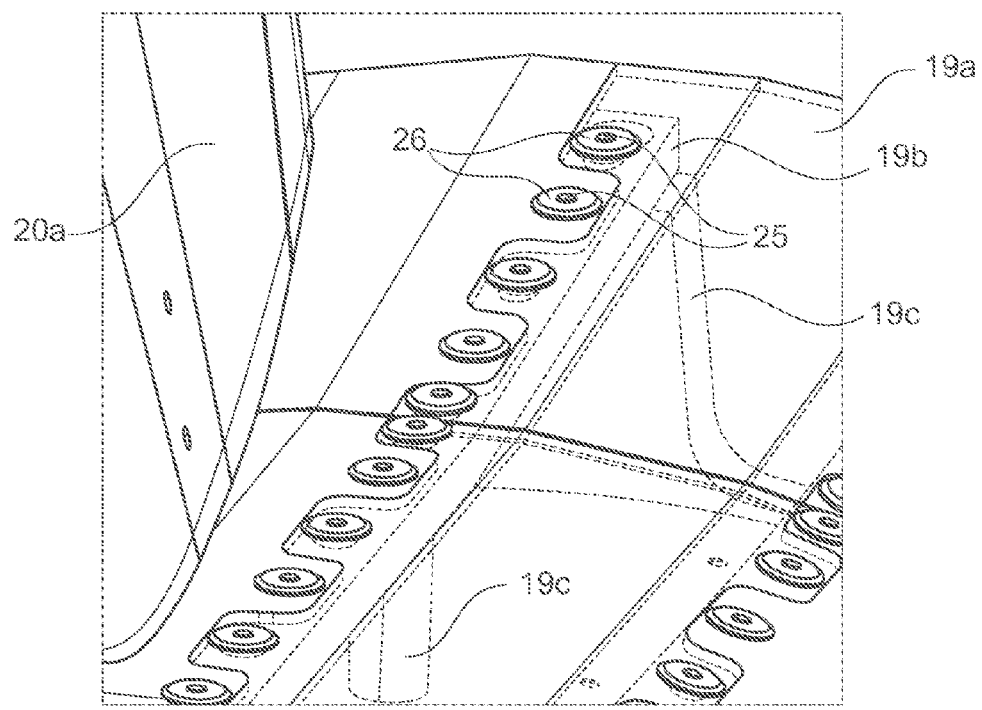
FIG. 8 shows a fastening of the segments on the support structure from FIG. 7 by means of stud bolts and clamping nuts according to another exemplary embodiment of the invention.

It is also possible, however, and advantageous especially in the case of more demanding regions of application, if according to FIG. 8 the mountings 19b are provided with perpendicularly projecting stud bolts 25 which extend through corresponding holes in the segments 19a. The segments 19a are then fastened on the stud bolts 25 by means of clamping nuts 26.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

List of Designations

10 Gas turbine
11 Air intake
12 Compressor 13, 15 Combustion chamber
14, 16 Turbine
17, 17' Gas duct
18 Outer casing
18a Segment (outer casing)
19 Inner casing
19a Segment (inner casing)
19b Mounting (inner casing)
19c Support (inner casing)
19d Inner shell
19e Ring
19c Support strut
20a Segment (support strut)
21a, b Gas duct halves
22 Welded joint
23 Screw
24 Threaded hole
25 Stud bolt
26 Clamping nut

What is claimed is:

1. A gas duct for a gas turbine through which exhaust gases from the gas turbine are discharged to an outside, the gas duct comprising:
   an inner casing;
   an outer casing disposed at a distance from the inner casing and concentrically encompassing the inner casing; and
   a plurality of support struts arranged radially and interconnecting the inner casing and the outer casing,
   wherein each of the plurality of support struts, the inner casing and the outer casing each have a heat-resistant lining disposed so as to provide protection against heat from the exhaust gases, the heat-resistant linings of each of the plurality of support struts, the inner casing and the outer casing being divided in each case into a plurality of separate segments that are fastened to a support structure in an arrangement for reducing stress from thermal expansion of each of the plurality of separate segments,
   wherein the support structure includes a plurality of mountings in a region of the outer casing and the inner casing, wherein each of the plurality of mountings include a respective mounting surface and a respective end surface orthogonal to said respective mounting surface, each of the plurality of separate segments of the heat resistant linings of each of the outer casing and the inner casing being fastened to respective ones of the plurality of mountings by means for fastening at the respective mounting surfaces of the respective ones of the plurality of mountings,
   wherein each of the plurality of mountings are circumferentially spaced apart from each other by such a distance that a first end and a second end of each of the plurality of separate segments is fastened on two adjacent mountings of the plurality of mountings and extends circumferentially between the two adjacent mountings,
   wherein each of the plurality of mountings extend parallel to remaining mountings of the plurality of mountings in an axial direction along a center line of the gas duct, the respective end surface of each of the plurality of mountings abuts the inner casing, and
   wherein each of the plurality of mountings is fastened on a concentric inner shell using a plurality of radial supports spaced apart in the axial direction.

2. The gas duct according to claim 1, wherein each of the plurality of separate segments are detachably fastened on the support structure.

3. The gas duct according to claim 1, wherein each of the plurality of separate segments is fixed relative to the support structure at at least one fastening point and is fastened in a way that allows for thermal expansion at other fastening points.

4. The gas duct according to claim 1, wherein each of the plurality of separate segments is fastened in a way that allows for thermal expansion relative to the support structure at all fastening points.

5. The gas duct according to claim 1, wherein each of the plurality of mountings include a plurality of threaded holes configured to receive respective means for fastening through corresponding holes in each of the plurality of separate segments of the heat resistant linings of the outer casing and the inner casing, wherein the means for fastening is screws.

6. The gas duct according to claim 1, wherein each of the plurality of mountings include the means for fastening which extend through corresponding holes in each of the plurality of separate segments, each of the plurality of separate segments being fastened on respective ones of the means for fastening using corresponding clamping nuts, wherein the means for fastening is a plurality of stud bolts.

7. The gas duct according to claim 1, wherein the inner casing includes a ring, and the respective end surface of each of the plurality of mountings abuts the ring of the inner casing.

8. The gas duct according to claim 1, wherein the inner casing includes a plurality of radially projecting supports, wherein the respective end surface of each of the plurality of mountings abuts a respective radially projecting support of the plurality of radially projecting supports.

9. A gas turbine comprising:
   an exhaust-side gas duct disposed so as to discharge exhaust gases from the gas turbine to an outside, the gas duct comprising:
   a concentric inner casing;
   an outer casing disposed at a distance from the inner casing and concentrically encompassing the inner casing; and
   a plurality of support struts arranged radially and interconnecting the inner casing and the outer casing, wherein each of the plurality of support struts, the inner casing and the outer casing each have a heat-resistant lining disposed so as to provide protection against heat from the exhaust gases, the heat-resistant linings of each of the plurality of support struts, the inner casing and the outer casing being divided in each case into a plurality of separate segments that are fastened to a support structure in an arrangement for reducing stress from thermal expansion of each of the plurality of separate segments,
   wherein the support structure includes a plurality of mountings in a region of the outer casing and the inner casing, wherein each of the plurality of mountings include a respective mounting surface and a respective end surface orthogonal to said respective mounting surface, each of the plurality of separate segments of the heat resistant linings of each of the outer casing and the inner casing being fastened to respective ones of the plurality of mountings by means for fastening at the respective mounting surfaces of the respective ones of the plurality of mountings,
   wherein each of the plurality of mountings are circumferentially spaced apart from each other by such a distance that a first end and a second end of each of the plurality of separate segments is fastened on two adjacent mountings of the plurality of mountings and extends circumferentially between the two adjacent mountings,
   wherein each of the plurality of mountings extend parallel to remaining mountings of the plurality of mountings in an axial direction along a center line of the gas duct, and the respective end surface of each of the plurality of mountings abuts the inner casing, and wherein each of the plurality of mountings is fastened on a concentric inner shell using a plurality of radial supports spaced apart in the axial direction.

10. The gas turbine according to claim 9, wherein the inner casing includes a ring, and the respective end surface of each of the plurality of mountings abuts the ring of the inner casing.

11. The gas turbine according to claim 9, wherein the inner casing includes a plurality of radially projecting supports, and the respective end surface of each of the plurality of mountings abuts a respective radially projecting support of the plurality of radially projecting supports.

* * * * *